UNITED STATES PATENT OFFICE.

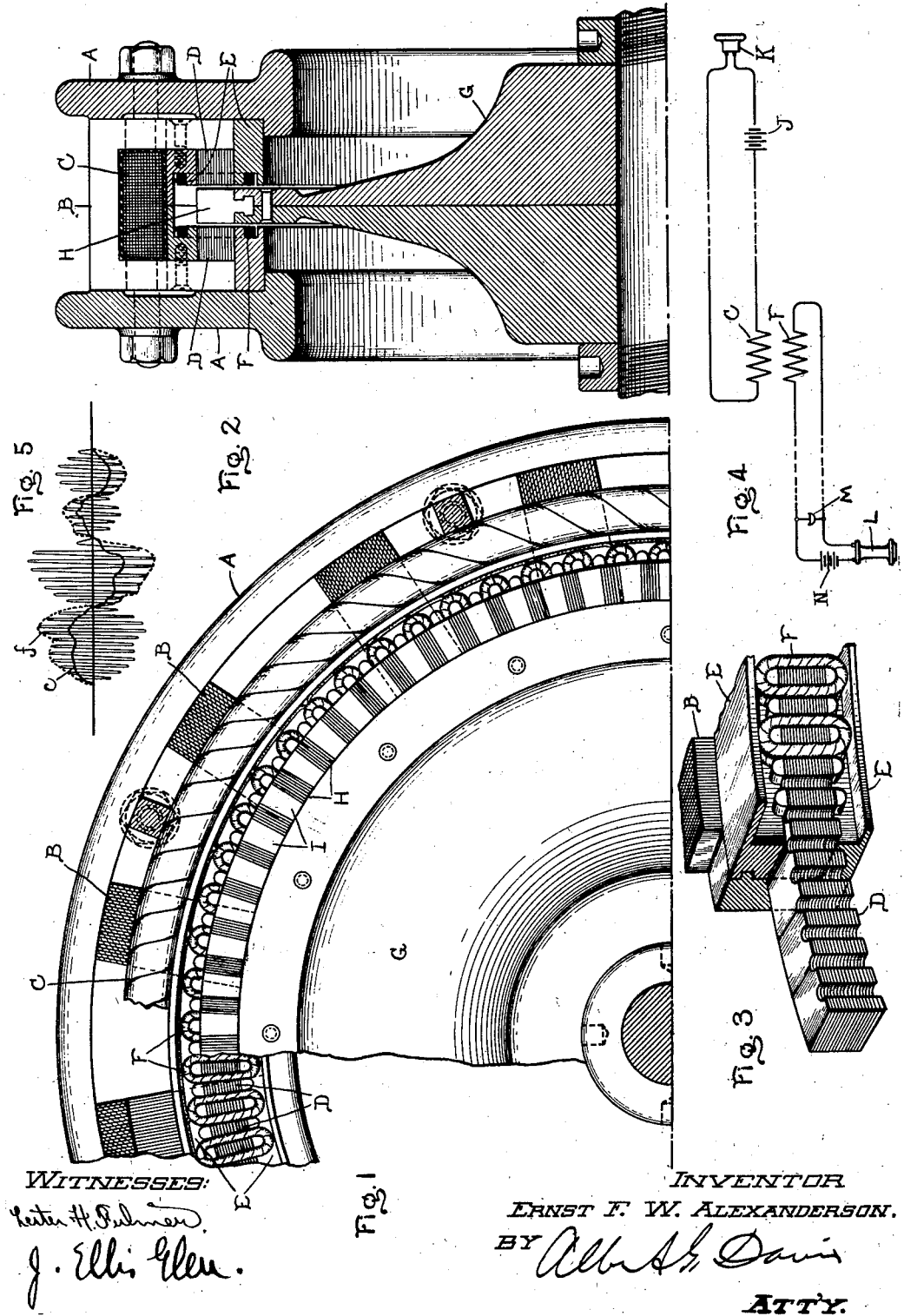

ERNST F. W. ALEXANDERSON, OF SCHENECTADY, NEW YORK, ASSIGNOR TO GENERAL ELECTRIC COMPANY, A CORPORATION OF NEW YORK.

TELEPHONE-RELAY.

No. 902,195.  Specification of Letters Patent.  Patented Oct. 27, 1908.

Application filed January 25, 1908. Serial No. 412,555.

*To all whom it may concern:*

Be it known that I, ERNST F. W. ALEXANDERSON, a citizen of the United States, residing at Schenectady, county of Schenectady, State of New York, have invented certain new and useful Improvements in Telephone-Relays, of which the following is a specification.

My invention relates to telephone relays, and its object is to provide a telephone relay of novel design, which is of practical and commercial value.

It has been proposed heretofore to employ as telephone relays dynamo-electric machines of the direct-current type, having the field winding in the primary circuit and the armature winding in the secondary circuit, so as to produce in the secondary circuit currents of the same frequency and wave-form as the currents in the primary circuit. The operation of such devices is interfered with by the disturbing effect of the collecting devices, and, so far as I am aware, no relay of this type is in commercial use.

My invention, broadly stated, consists in using a dynamo-electric machine of the high-frequency inductor-alternator type as a telephone relay. In such a machine both the field winding and the armature winding may be stationary; the only moving part being the inductor, which is magnetized by the field winding. I design the inductor so that its natural frequency, which is determined by the number of its poles and its speed, is very high compared with the frequency of the currents in a telephone circuit, so that each wave or pulsation of the telephone current corresponds to a large number of the alternations due to the movement of the inductor. The variation of the current in the primary circuit in which the field winding is connected does not change the frequency of the armature currents, but does change the amplitude of these currents; and if their frequency is above that of an audible note, the effect on a telephone receiver is simply that of the variation in amplitude, which corresponds to the variation of current in the primary circuit.

My invention further comprises certain novel features in the construction of the induction alternator, whereby its efficiency is improved.

These features, which will be definitely pointed out in the appended claims, will best be understood by reference to the accompanying drawing, in which Figure 1 shows a partial end view partly in cross-section, of an inductor alternator designed in accordance with my invention for use in a telephone relay; Fig. 2 shows a side elevation of the same; Fig. 3 shows a detail perspective view; Fig. 4 is a diagram of connections; and Fig. 5 is a diagram of the current waves in the machine.

In the drawing, A A represent end-frames or standards between which the magnetic circuit of the stator is secured. This magnetic circuit comprises bundles or blocks of laminations B B, arranged radially and surrounding the field coil C, which extends circumferentially around the machine, and the laminations D, which extend in a circumferential direction, and form with the laminations B a nearly closed magnetic circuit for the field winding C. The laminations are supported and spaced apart by non-magnetic spacing blocks E. The air-gap in the magnetic circuit of the stator has its opposite faces lying in adjacent radial planes; and in slots on these faces are placed the coils F of the armature winding.

G represents the inductor, which is shaped for maximum strength with respect to centrifugal strains, in order that it may be operated at very high speeds. This inductor carries at its rim magnetic poles H formed of small bundles of laminations, which revolve between the opposite faces of the magnetic circuit of the stator. Non-magnetic blocks I may be placed between the magnetic poles H, in order to strengthen the poles mechanically, and to decrease windage losses.

The connections of the field and armature windings are as indicated in Fig. 4. The field winding C is connected in circuit with a source of current J and telephone transmitter K, either directly or through a transformer, according to common telephone practice. The armature winding F is connected in circuit with a suitable receiving device, which may comprise a liquid receiver M of a type well known in wireless telegraphy, and a telephone receiver L and a source of current N connected in shunt to the liquid receiver M; the principle of this arrangement being that the high-frequency alternations impressed on the liquid receiver M vary its resistance, and the resistance variations result in current variations in the telephone receiver, which are audible therein. It will be understood that the particular form of receiving device is no part of my invention, and any suitable form of receiver may be employed.

The principle of operation of the telephone relay is as follows: The currents in the armature or transmitter circuit vary in amount when a message is being transmitted, and this variation may be represented by the curve *c* in Fig. 5. The currents induced in the armature winding are of a high frequency, compared with the currents in the primary circuit, and may be represented by the curve *f* in Fig. 5. The frequency of these currents is not affected by the currents in the primary circuit, but their amplitude is affected and varies in proportion to the primary current, as is shown in Fig. 5. The frequency of the armature currents is so high as to be inaudible in a telephone receiver, but the variation in amplitude produces audible sounds in the receiver of similar quality to, but of greater amount than, those that would be heard if a telephone receiver were substituted for the field winding of the alternator in the primary circuit.

It has already been pointed out that the stator laminations D extend circumferentially, while the laminations B, forming the greater part of the magnetic circuit, extend radially. The purpose of the circumferential arrangement of the laminations D is to localize the flux variations due to the high-frequency armature currents. Since the laminations in which the armature coils are placed extend circumferentially, the flux due to the currents in these coils can close itself directly around the coils, without producing any variations in the main part of the magnetic circuit.

What I claim as new and desire to secure by Letters Patent of the United States, is:

1. A telephone relay comprising a high-frequency inductor alternator having a stationary field winding connected in the primary circuit and a stationary armature winding connected in the secondary circuit.

2. In combination, a high-frequency inductor alternator having both field and armature windings stationary, a telephone transmitter and a source of current in circuit with the field winding of the alternator, and a telephone receiver in circuit with the armature winding of the alternator.

3. A telephone relay comprising a laminated stator, a stationary field winding connected in the primary circuit, an inductor magnetized thereby adapted to be driven at high speed and having a large number of laminated polar projections, and a stationary armature winding connected in the secondary circuit and adapted to have high frequency alternating-current induced in it by said inductor.

4. A telephone relay comprising a laminated stator having opposite faces lying in adjacent radial planes, a stationary field winding connected in the primary circuit, an inductor magnetized thereby adapted to be driven at high speed and having a large number of laminated polar projections extending between the opposite stator faces, and a winding carried in slots on said faces and connected in the secondary circuit.

5. A telephone relay comprising a laminated stator having opposite faces lying in adjacent radial planes, the laminations near said faces extending circumferentially, a stationary field winding connected in the primary circuit, an inductor magnetized thereby adapted to be driven at high speed and having a large number of narrow laminated polar projections extending between the opposite faces, and a winding carried in slots on said faces and connected in the secondary circuit.

6. A telephone relay comprising a laminated stator having opposite faces lying in adjacent radial planes, the laminations forming the greater part of the magnetic circuit lying in substantially radial planes, but the laminations near said faces extending circumferentially, a stationary field winding connected in the primary circuit, an inductor magnetized thereby adapted to be driven at high speed and having a large number of narrow laminated polar projections extending between the opposite stator faces, and a winding carried in slots on said faces and connected in the secondary circuit.

7. A telephone relay comprising a laminated stator having opposite faces lying in adjacent radial planes, a stationary field winding connected in the primary circuit, an inductor magnetized thereby adapted to be driven at high speed and having a large number of laminated polar projections extending between the opposite stator faces, the spaces between said polar projections being filled with non-magnetic material, and a winding carried in slots on said faces and connected in the secondary circuit.

In witness whereof, I have hereunto set my hand this 23rd day of January, 1908.

ERNST F. W. ALEXANDERSON.

Witnesses:
BENJAMIN B. HULL,
HELEN ORFORD.